(12) United States Patent
Uh

(10) Patent No.: US 8,124,271 B2
(45) Date of Patent: Feb. 28, 2012

(54) SECONDARY BATTERY

(75) Inventor: Hwail Uh, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1015 days.

(21) Appl. No.: 12/076,545

(22) Filed: Mar. 19, 2008

(65) Prior Publication Data
US 2008/0274402 A1 Nov. 6, 2008

(30) Foreign Application Priority Data

May 2, 2007 (KR) .................. 10-2007-0042687

(51) Int. Cl.
*H01M 2/04* (2006.01)
*H01M 2/08* (2006.01)
(52) U.S. Cl. ......... 429/175; 429/161; 429/163; 429/178
(58) Field of Classification Search ................. 429/175
See application file for complete search history.

(56) References Cited

U.S. PATENT DOCUMENTS
2006/0246349 A1 * 11/2006 Uh ................... 429/175

FOREIGN PATENT DOCUMENTS

| JP | 08-162084 | 6/1996 |
|---|---|---|
| JP | 2005-327592 | 11/2005 |
| KR | 10-2006-0034125 | 4/2006 |
| KR | 100614389 B1 | 4/2006 |
| KR | 100790873 B1 | 4/2006 |
| KR | 10-2007-0102264 | 10/2007 |

\* cited by examiner

*Primary Examiner* — Barbara L. Gilliam
*Assistant Examiner* — Maria J Laios
(74) *Attorney, Agent, or Firm* — Robert E. Bushnell, Esq.

(57) ABSTRACT

The present invention relates to a secondary battery including an insulating case interposed between the cap assembly and the electrode assembly. The insulating case is made of a sealing material with low thermal deformation, excellent flame-retardation, and excellent electric insulation so as to be able to enhance the reliability of the secondary battery. The secondary battery of the present invention includes a can having an open top, an electrode assembly disposed inside the can and generating electricity, a cap assembly sealing the open top of the can, and an insulating case interposed between the cap assembly and the electrode assembly. The insulating case includes a base having an upper surface and a side surface, and a protrusion formed on the side surface. The upper surface has a deformation hole. The deformation hole and the protrusion are arranged in a manner that a line connecting the center of the deformation hole to the protrusion is substantially perpendicular to the side surface.

14 Claims, 6 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 2 May 2007 and there duly assigned Serial No. 10-2007-0042687.

BACKGROUND OF THE INVENTION

1. Field of the Invention

The present invention relates to a secondary battery including an insulating case that is made of a sealing material having low thermal deformation, excellent flame-retardation, and excellent electric insulation so as to be able to enhance reliability of the secondary battery. The insulating case is disposed between a cap assembly and an electrode assembly of the secondary battery.

2. Description of the Related Art

A secondary battery is a battery that can be charged and discharged several times or more. Such a secondary battery is classified into various kinds depending on core substances associated with the charge and discharge of the battery and its appearance. Recently, square type lithium secondary battery is most widely used.

A secondary battery can be reused by charging and discharging several tens times or more while having power feeding ability equal to or more than an existing manganese dry battery, thereby can be used in a variety of applications. To this end, the secondary battery should have a shape and a size adaptable to each application, and a square type secondary battery is an example.

The square type secondary battery uses a metallic can with a thin thickness and a relatively long length. The inside of the can is formed with a space for receiving an electrode assembly and an electrolyte, and the can is manufactured in a well-type container, only one side of which is open. The aperture of the can receiving the electrode assembly is sealed with a combination of an insulating case and a cap assembly.

The secondary battery, in which the inside of the can is provided with the electrode assembly configured of a positive electrode plate, a negative electrode plate, and a separator and the electrolyte, charges and discharges electricity by a chemical reaction therebetween. The breakage of a secondary battery often occurs due to an internal short circuit, overcharge, overdischarge, and so on. In particular, if the negative occurrence, such as a short circuit, overcharge, and overdischarge, continues for a certain time, the temperature of the secondary battery significantly rises, and in the worse case, the secondary battery may explode.

Moreover, if the negative occurrence described above continues, the electrode assembly, the insulating case, and the cap assembly received in the inside of the can may be frequently damaged. The damage of the parts located inside the can leads to deformation of the can in shape, physical property, and so on. As a result, the sealing condition of the can becomes weak so that the electrolyte may leak from the can, thereby leading to lose the function as a secondary battery.

SUMMARY OF THE INVENTION

Accordingly, it is an aspect of the present invention to provide a secondary battery including a sealing material with low thermal deformation, excellent flame-retardation, and excellent electric insulation so as to be able to enhance its reliability.

And, it is another aspect of the present invention to provide a secondary battery employing an insulating case which has higher mechanical stability than the conventional insulating case, which is made of high-hardness materials, and which has a structure that can be coupled with a can of the battery.

In order to accomplish the aspects, the present invention provides a secondary battery that includes a can having an open top, an electrode assembly disposed inside the can and generating electricity, a cap assembly sealing the open top of the can, and an insulating case interposed between the cap assembly and the electrode assembly. The insulating case includes a base having an upper surface and a first side surface, and a first protrusion formed on the first side surface. The upper surface of the base is substantially parallel to the open top of the can and has a first deformation hole. The first protrusion protrudes in a direction parallel to the upper surface. The first protrusion has a first contact portion that contacts an inner surface of the can.

The insulating case may be made of a material including polyphenylene sulfide.

The first deformation hole and the first protrusion are arranged in a manner that a line connecting the center of the first deformation hole to the first contact portion of the first protrusion is substantially perpendicular to the first side surface.

The base may have a second side surface, and the insulating case may further include a second protrusion formed on the second side surface. The second protrusion protrudes in a direction parallel to the upper surface. The second protrusion has a second contact portion that contacts the inner surface of the can. The first deformation hole and the second protrusion can be arranged in a manner that a line connecting the center of the first deformation hole to the second contact portion of the second protrusion is substantially perpendicular to the second side surface. The first side surface may be substantially parallel to the second side surface.

The base may have a second side surface, and the upper surface of the base may have a second deformation hole. The insulating case may further include a second protrusion formed on the second side surface and protruding in a direction parallel to the upper surface. The second protrusion has a second contact portion that contacts the inner surface of the can. A line connecting the center of the second deformation hole to the second contact portion of the second protrusion is substantially perpendicular to the second side surface. The center of the first deformation hole may be closer to the first side surface than the second side surface, and the center of the second deformation hole may be closer to the second side surface than the first side surface.

The first side surface may be substantially parallel to the second side surface, and the first protrusion and the second protrusion directly may face each other across the base.

The first side surface may be substantially parallel to the second side surface, and a line connecting the first contact portion of the first protrusion to the second contact portion of the second protrusion may not be perpendicular to the first side surface.

The insulating case may further comprise a third protrusion formed on the first side surface and protruding in a direction parallel to the upper surface. The third protrusion has a third contact portion that contacts the inner surface of the can. The upper surface of the base may have a third deformation hole. A line connecting the center of the third deformation hole to the third contact portion of the third protrusion may be substantially perpendicular to the first side surface.

The base may have a lead through hole, through which a lead drawn from the electrode assembly is penetrated, and an electrolyte injection hole for injecting an electrolyte inside the can. The first protrusion may be formed in a shape of a hemisphere.

The insulating case may further comprise a wing formed on an edge of the upper surface of the base. The wing protrudes in a direction substantially perpendicular to the upper surface.

Other features and effects of the invention in addition to the aspects described above will become apparent from the detailed description of the embodiments taken in conjunction with the accompanying drawings.

The following detailed description with reference to the accompanying drawings intends to explain the preferred embodiments and does not indicate only the forms capable of carrying out the present invention. It is to be noted that the same or equivalent functions comprised in the spirit or scope of the present invention can be achieved with other embodiments.

Any features shown in the drawings are enlarged for easiness of explanation and the drawings and components thereof are not necessarily shown to scale. However, those skilled in the art will easily understand such detailed contents.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Hereinafter, the embodiment of the present invention will be described in more detail with reference to the accompanying drawings.

Figure 1:
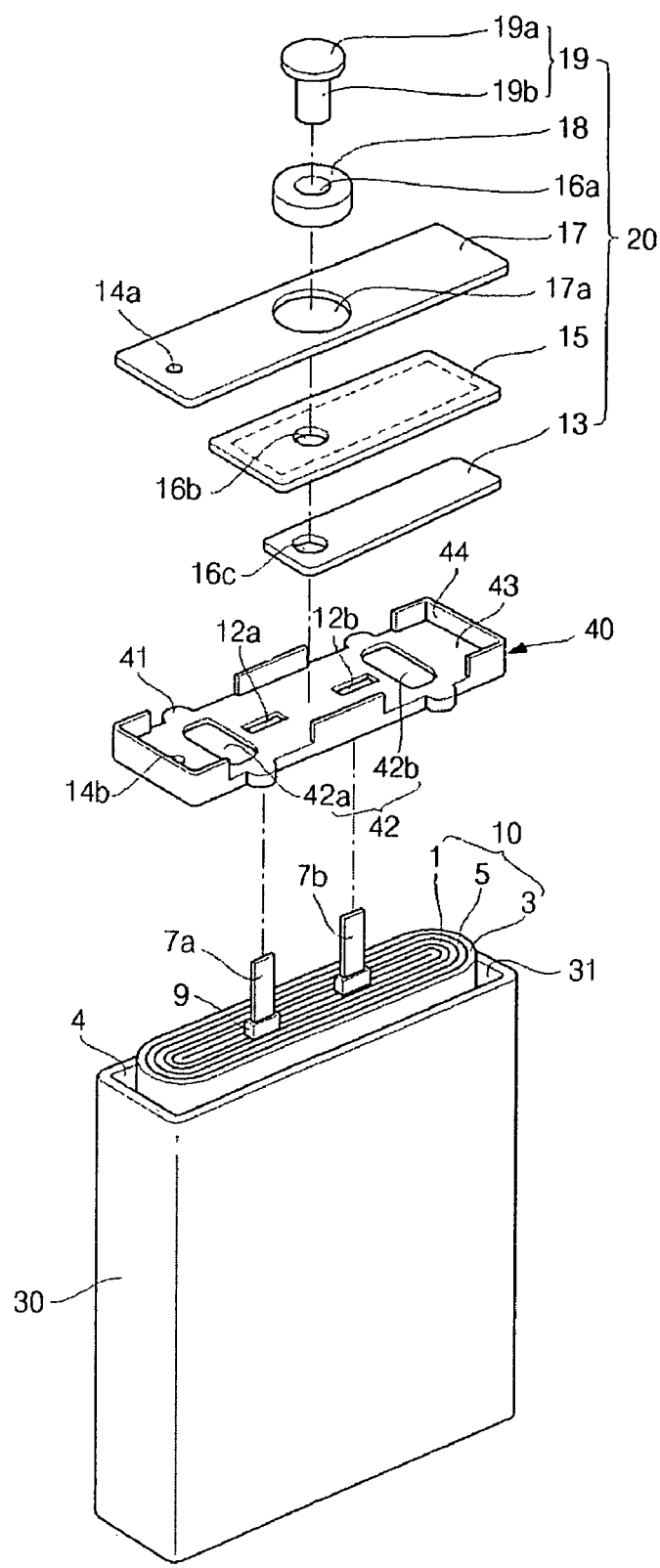
FIG. 1 is an exploded perspective view showing a structure of a secondary battery proposed in the present invention.

FIG. 1 is an exploded perspective view showing a structure of a secondary battery according to the present invention. Referring to FIG. 1, the secondary battery of the present invention comprises a can 30, an electrode assembly 10, an insulating case 40, and a cap assembly 20.

The can 30 is a container in a form of approximately rectangular parallelepiped pillar (or well), and can easily made by a deep drawing. A cavity 4 of the can 30 receives the electrode assembly 10, the insulating case 40, and the cap assembly 20, and is sealed with a cap plate 17 of the cap assembly 20. The can 30 is made of metals with excellent mechanical and electrical properties, such as heat resistance, wear resistance, conductivity. For examples of these metals, there may be aluminum, aluminum alloy, and equivalent metals thereof. However, the present invention is not limited to the metals listed above, but a different material can be used for the can 30 depending on the usage or the environment. The can 30 can be connected to a positive electrode terminal 7a or a negative electrode terminal 7b of the electrode assembly 10 so that it can be used as a positive electrode or a negative electrode of the secondary battery.

The electrode assembly 10 comprises a positive electrode 1, a negative electrode 3, a separator 5, and positive and negative electrode terminals 7a and 7b. The electrode assembly 10 in which the positive electrode 1 and the negative electrode 3 are formed in a form of a wide plate or a metal foil in order to increase electric capacity, and the separator 5 is inserted between the positive electrode 1 and the negative electrode 3 to be stacked. And, the electrode assembly 10 is formed in a form of a jelly role by winding the stack of the positive electrode 1, the negative electrode 3, and the separator 5. FIG. 1 shows the electrode assembly 10 in a form of the jelly role. However, the present invention is not limited to the form described above.

Each of the positive electrode 1 and the negative electrode 3 is made by coating an aluminum metal foil and a copper metal foil with slurry, and then drying the slurry-coated foils. At this time, the slurry comprises gluing agent attaching positive electrode active materials or the negative active material to the metal foil. For the positive electrode active materials, lithium containing oxide is mainly used, and for the negative electrode active materials, any one of hard carbon, soft carbon, graphite, and carbon substances is mainly used. However, the present invention is not limited thereto.

The separator 5 is disposed between the positive electrode 1 and the negative electrode 3 in order to insulate the positive electrode 1 from the negative electrode 3. And, the separator 5 provides a path for moving ions between the positive electrode 1 and the negative electrode 3. To this end, the separator 5 can be made of a material such as porous polyethylene, polypropylene, co-polymer of polypropylene and polyethylene and equivalent substances thereof, or the combination substances thereof. However, the present invention is not limited thereto. The width of the separator 5 may be larger than those of the positive electrode 1 and the negative electrode 3 in order to prevent the short circuit between the positive electrode 1 and the negative electrode 3.

The positive electrode terminal 7a and the negative electrode terminal 7b are connected to the positive electrode 1 and the negative electrode 3 of the electrode assembly, respectively, and are drawn outside the electrode assembly 10. To this end, the positive electrode terminal 7a and the negative electrode terminal 7b, respectively, penetrate a first and second lead through holes 12a and 12b of the insulating case 40. Each of the positive and negative electrode terminals 7a and 7b is formed on the top of the electrode assembly 10 so that it can be electrically connected to the can 30 or a terminal plate 13. The positive electrode terminal 7a and the negative electrode terminal 7b are used as a primary conducting path between an external circuit or an apparatus and the electrode assembly 10. In addition, the positive electrode terminal 7a and the negative electrode terminal 7b may be insulated with an insulating tape 9 for preventing short circuit.

When the insulating case 40 is inserted into the can 30, the insulating case 40 holds to hold the electrode assembly 10, and to provide insulation between the can 30 and the cap assembly 20. To this end, the insulating case 40 includes a base 43 and a wing 44. The insulating case 40 of the secondary battery of the present invention is made of rigid plastic resin. One example of the resin is polyphenylene sulfide resin (PPS). The PPS is rigid thermoplastic resin, and is a material with high heat distortion temperature, excellent flame-retardation, strong erosion resistance against organic solvent, and excellent electric insulation. Thereby, when the insulating case 40 is inserted into the can 30, the deformation due to the electrolyte does not occur, and the insulation between the electrode assembly 10 and the cap assembly 20 maintains. Further, even when the temperature of the secondary battery rises due to internal short circuit of the secondary battery, and the like, the damage due to heat does not occur, making it possible to promote the safety of the secondary battery. However, when using the rigid plastic resin such as the PPS for the insulating case 40, it is difficult to couple the insulating case to the can due to weak elasticity. As a result, another separate element is required in order to overcome the problem. To this end, the insulating case 40 is built with the base 43 and the wing 44 as described above, and has a structure capable of being easily coupled to the can 30.

The base 43 is formed of a plate shape with an approximately constant thickness. The shape of the base 43 is formed in a shape similar to the cavity 4 of the can 30, in particular similar to a sectional shape of the remaining space of the cavity 4 after the electrode assembly 10 is inserted inside the can 30. In particular, the base 43 is formed to be slightly less than the sectional size of the remaining space so that it can easily be coupled to the can 30. The base 43 is formed with a second electrolyte injection hole 14b and first and second lead through holes 12a and 12b. The base 43 is formed with a protrusion 41 that is extended from the plate of the base 43 in a direction parallel to the plate. A deformation hole 42 is formed on the plate of the base 43 in a position corresponding to the position of the protrusion 41. FIG. 1 shows a first deformation hole 42a and a second deformation hole 42b. Each of the first and second deformation holes is formed on a position between two protrusions 41. That is, the deformation holes 42a and 42b are formed in the inner side of the protrusions 41. A detailed shape and effect of the protrusion and the deformation hole 42 will be described with reference to the following drawings.

The wing 44 is formed on a portion of an edge of the base 43, and is integrally formed with the base 43. The wing protruded upwards perpendicular to the plate of the base 43, but seamlessly formed with the base 43. The wing 44 functions to maintain an interval between the cap plate 17 and the base 43 when the cap assembly 20 and the insulating case 40 are received in the can 30, and form a space in which the cap assembly is safely mounted. Further, the wing 44 serves as an insertion guide when the insulating case 40 is inserted inside the can 30. FIG. 1 shows the four wings 44 partially and symmetrically formed, but the present invention is not limited thereto.

The cap assembly 20 comprises a cap plate 17, an electrode terminal 19, an insulating plate 15, a terminal plate 13, and a gasket 18.

Once the cap assembly 20 is assembled into the can 30, the cap plate 17 forms one surface of the can 30 sealing an aperture 31 of the can while combining the cap assembly 20 with the can 30. To this end, the cap plate 17 is bonded to the can 30 by using the methods, such as a welding, etc. And, the cap plate 17 is electrically connected to one of the positive electrode terminal 7a and the negative electrode terminal 7b, which are drawn through the lead through holes 12a and 12b of the insulating case 40, respectively. Further, the cap plate 17 is formed with a terminal through hole 17a that is coupled with a gasket 18, and a first electrolyte injection hole 14a for injecting the electrolyte.

The gasket 18 is inserted to the terminal through hole 17a in order to insulate the electrode terminal 19 from the cap plate 17. The gasket 18 is formed with a first terminal through hole 16a in order to have the electrode terminal 19 penetrate the gasket 18.

The electrolyte injection holes 14a and 14b, formed in the cap plate 17 and the insulating case 40, respectively, are used for a path for injecting electrolyte into the can 30. The first electrolyte injection hole 14a is sealed after injecting the electrolyte.

The insulating plate 15 is inserted between the cap plate 17 and the terminal plate 13 to insulate the cap plate 17 from the terminal plate 13. The insulating plate 15 is formed with a second terminal through hole 16b through which the electrode terminal 19 penetrates.

The terminal plate 13 is electrically connected to the electrode terminal 19 by tightly fixing the electrode terminal 19 into a third terminal through hole 16c that is formed on the terminal plate 13. The terminal plate 13 is also electrically connected to one of the positive electrode terminal 7a and the negative electrode terminal 7b, which is not connected to the cap plate 17. In other words, if the cap plate 17 is electrically connected to the positive electrode terminal 7a, the terminal plate 13 is connected to the negative electrode terminal 7b. In this case, the terminal plate 13 electrically connects the electrode terminal 19 to the negative electrode terminal 7b.

The electrode terminal 19 is used for a terminal of one of the positive electrode and the negative electrode of the secondary battery. The can 30 is, then, used for another terminal of another of the positive electrode and the negative electrode of the secondary battery. To this end, the electrode terminal 19 is electrically connected to the terminal plate 13 through the first to third terminal through holes 16a, 16b, and 16c. The electrode terminal 19 is formed by a head 19a and a body 19b so that a part of the head 19a of the electrode terminal 19 is exposed to the outside of the cap plate 17. The head 19a is integrally formed with the body 19b, and the body 19b is formed to have a smaller diameter than the head 19a, and can have a different shape from the head 19a.

Figure 2A:
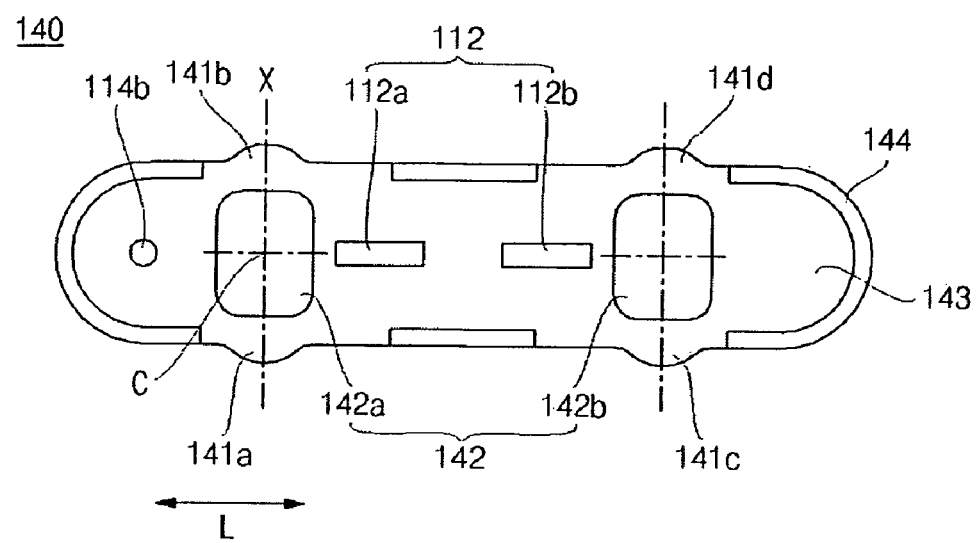
FIG. 2a is a detailed plan view showing the insulating case of FIG. 1.
Figure 2B:
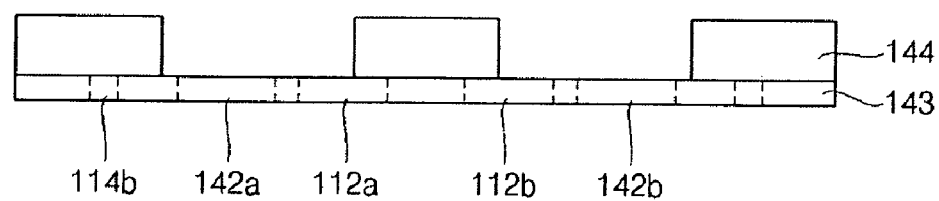
FIG. 2b is a detailed side view showing the insulating case of FIG. 1.
Figure 3A:
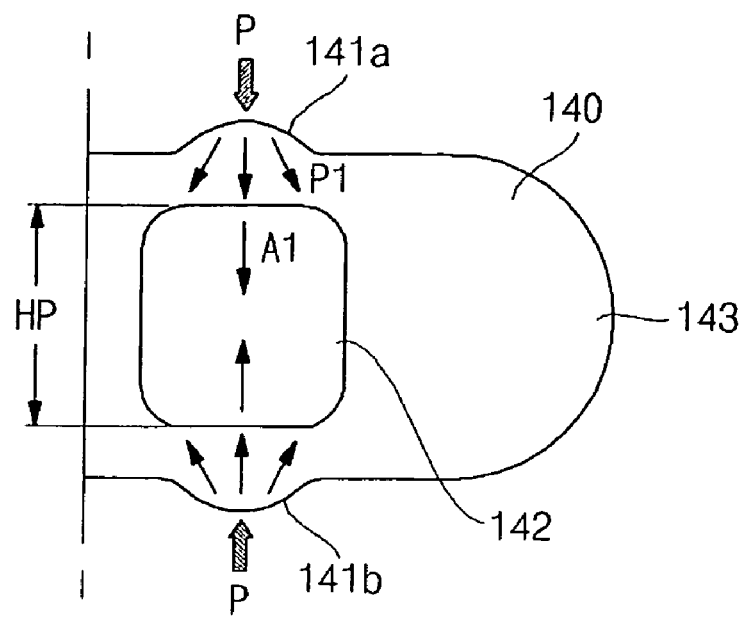
FIG. 3a is a partial plain view of an insulating case showing a relationship among a can, a protrusion, and a deformation hole before the insulating case is inserted into the can.
Figure 3B:
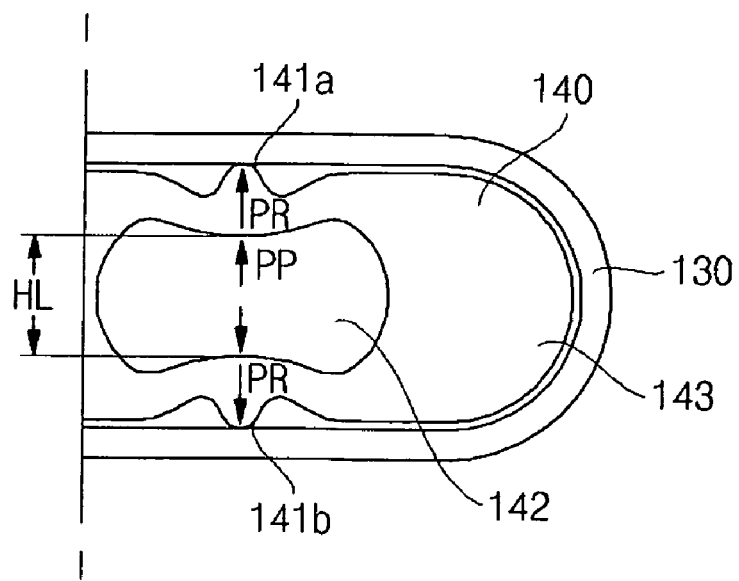
FIG. 3b is a partial plain view of an insulating case showing a relationship among a can, a protrusion, and a deformation hole after the insulating case is inserted into the can.

FIG. 2a is a detailed plan view showing the insulating case of FIG. 1. FIG. 2b is a detailed side view showing the insulating case of FIG. 1. FIG. 3a is a partial plain view of an insulating case showing the relationship among a can, a protrusion, and a deformation hole before the insulating case is inserted into the can. FIG. 3b is a partial plain view of an insulating case showing the relationship among a can, a protrusion, and a deformation hole after the insulating case is inserted into the can.

The protrusions 141a to 141d shown in FIG. 2a, FIG. 2b, FIG. 3a and FIG. 3b are formed on a side of the base 143 in a curved shape of an oval. Herein, the base 143 has an upper surface, a lower surface, and side surfaces. The base 143 has two side surfaces (a first and a second side surfaces) that are arranged along a longitudinal axis L. The first side surface and the second side surface face each other across the base, and can be substantially parallel to each other. In the examples shown in FIG. 2a, FIG. 2b and FIG. 3a and FIG. 3b, the protrusions 141a to 141d are formed on the side surfaces parallel to the longitudinal axis L, and symmetrically arranged to each other. In other words, a first and a third protrusions 141a and 141c are formed on a first side surface of the base 143, and a second and a fourth protrusions 141b and 141d are formed on a second side surface of the base 143. The first protrusion 141a faces the second protrusion 141b across the base 143, and the third protrusion 141c faces the fourth protrusion 141d. A first deformation hole 142a is formed on the upper surface of the base 143, and is disposed between the first protrusion 141a and the second protrusion 141b. A second deformation hole 142b is formed on the upper surface of the base 143, and is disposed between the third protrusion 141c and the fourth protrusion 141d. A central axis X of the first deformation hole 142a is an axis passing the first protrusion 141a, a center C of the first deformation hole 142a, and the second protrusion 141b. The shape of each of the first and the second protrusions 141a and 141b is symmetric about the central axis X of the first deformation hole 142a. By the same way, the shape of each of the third and fourth protrusions 141c and 141d is symmetric about a central axis X of the second deformation hole 142b. Each of the protrusions 141a to 141d has a contact portion that contacts an inner surface of a can when the insulating case is inserted inside the can. The arrangement between a protrusion and a corresponding deformation hole can be also described in a manner that a line connecting the center of the deformation hole to the contact portion of the protrusion is perpendicular to the side surface of the base on which the protrusion is formed. FIGS. 2a and 2b also show lead through holes 112 that includes a first and a second lead through holes 112a and 112b, an electrolyte injection hole 114b, and a wing 144.

As shown in FIG. 3a and FIG. 3b, while the insulating case 140 is being inserted into the can 130, pressure P is applied to the contact portions of the protrusions from the can 130, and pressure P1, which is distributed from pressure P, is applied to the deformation hole 142. Thereby, the deformation hole 142 is deformed by being pressed towards a central direction A1 of the deformation hole 142. As a result, the insulating case 140 can be inserted inside the can 130 as shown in FIG. 3b.

After the insulating case 140 is inserted into the can 130, restoring force is applied by the protrusions 141a and 141b, and restoring pressure PR is applied to the can 130 by the protrusions. With the restoring pressure, the insulating case 140 is rigidly fixed in the inner wall of the case 130. During the insertion process described above, the deformation hole 142 first maintains a first width HP, but after being inserted into the can 130, the deformation hole 142 is distorted having a second width HL, and maintains a slightly distorted shape.

The insulating case 140 is made using a rigid plastic resin as described with reference to FIG. 1. In other words, since the insulating case 140 of the present invention is made of the more rigid plastic resin than that of the conventional insulating case, the insulating case 140 of the present invention may have higher stress, less elasticity, and less flexibility as compared with the conventional insulating case. Accordingly, if the insulating case is used in an existing shape without a deformation hole, it is difficult to insert the insulating case 140 into the can 130 due to the protrusions. However, in the present invention, a deformation hole is formed at a location at which pressure through the protrusions 141 is applied. Therefore, the deformation of the insulating case through the deformation hole is induced. As a result, even when the insulating case 140 is made of the rigid plastic resin, it can be slightly deformed, making it possible to easily insert the insulating case 140 into the can 130. Further, since the insulating case 140 of the present invention has lower elasticity and flexibility as compared to the conventional insulating case, it has larger restoring force even with smaller deformation. As a result, it is possible to rigidly fix the insulating case in the inside of the can 130.

Meanwhile, as described above, it is preferable that the central axes X connecting the protrusions 141a and 141b passes the center C of the deformation hole 142. As can be appreciated from the transfer process of the deformation pressure shown in FIG. 3a and FIG. 3b, the pressure P applied to the protrusions 141a and 141b is slightly dispersed through arched portions of protrusions 141a and 141b, but is applied towards the center of the deformation hole 142. In other words, the deformation hole 142 is located on the path along which the dispersed pressure is applied, and each side portion of the deformation hole experiences lower pressure. Therefore, it possible to lead to the deformation with smaller force, and strong pressure is not applied, making it possible to minimize the break of the insulating case 140 and the can 130.

Figure 4A:
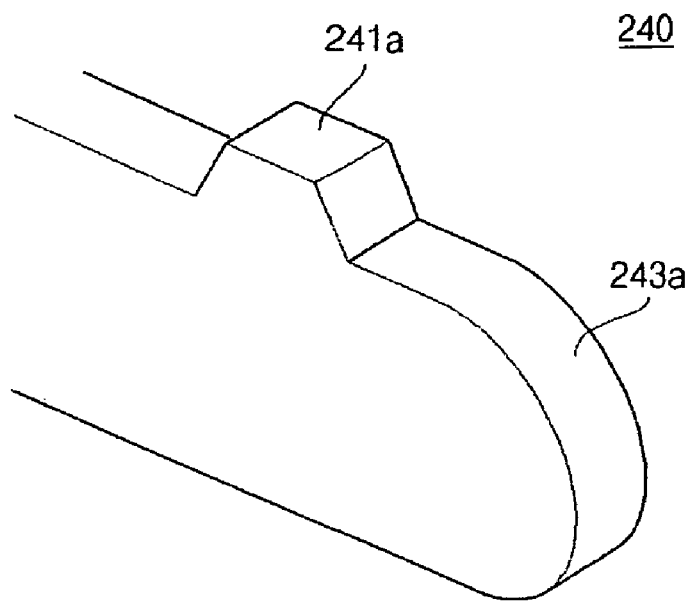
FIG. 4a is a partial perspective view of an insulating case showing an example of a shape of a trapezoidal protrusion.
Figure 4B:
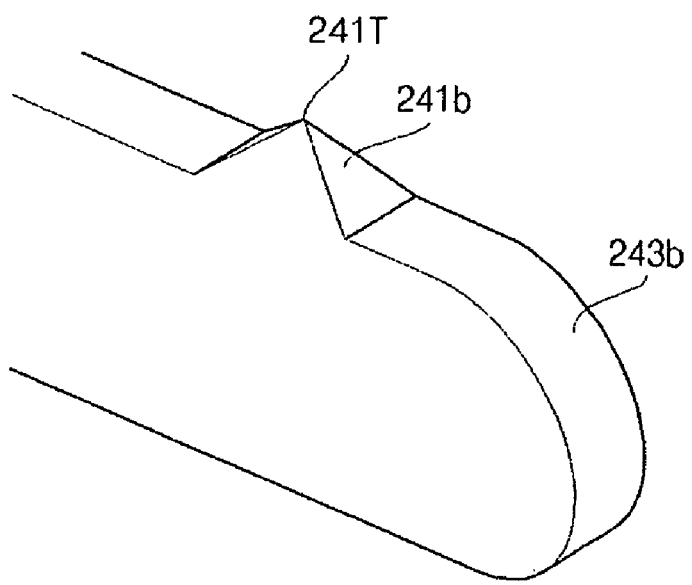
FIG. 4b is a partial perspective view of an insulating case showing an example of a shape of a square pyramid-like protrusion.

FIG. 4a is a partial perspective view of an insulating case showing an example of the shape of a trapezoidal protrusion. FIG. 4b is a partial perspective view of an insulating case showing an example of the shape of a square pyramid-like protrusion.

Referring to FIG. 4a and FIG. 4b, the protrusions described through FIG. 1 to FIG. 3a as described above has a hemisphere shape, but the shape of the protrusion is not limited thereto and various shapes can be applied as shown in FIG. 4a and FIG. 4b. The hemisphere shaped protrusions in FIG. 1 is good in sliding property along the inner surface of the cans. However, the restoring force is concentrated on one arched portion so that deformation of the cans may be caused. The square pyramid-like protrusion 241b shown in FIG. 4b has a similar problem in this respect. However, the trapezoidal protrusion 241a shown in FIG. 4a can overcome this problem that the restoring force is concentrated on one portion of the protrusion. Further, in the case of FIG. 4b, by chamfering the tip 241T of the square pyramid-like protrusion 241b, or by not sharply forming the tip of the square pyramid-like protrusion 241b, the restoring force can be dispersed as in the case of the trapezoidal protrusion 241a. The shapes of the protrusions shown in FIG. 4a and FIG. 4b are merely examples, and the present invention is not limited thereto. In the examples, one protrusion is shown, but, more than two protrusions can be grouped. In this case, the size of the protrusion may be smaller than that of the protrusion shown in the examples. However, the present invention is not limited thereto.

Figure 5A:
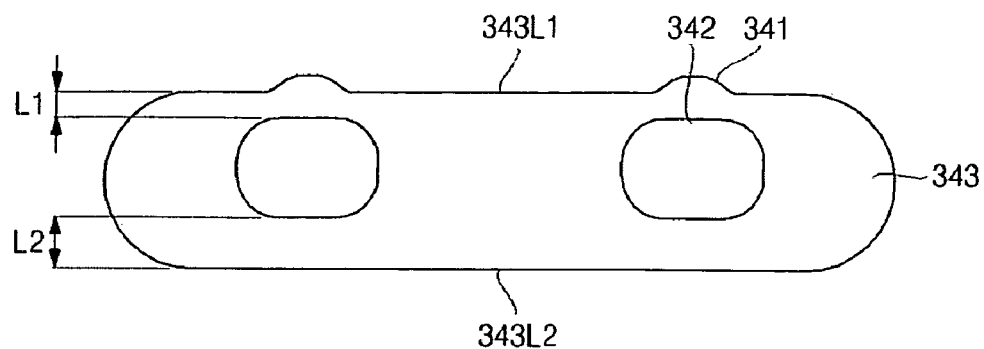
FIGS. 5a, 5b and 5c are plain views of insulating cases of other embodiments of the present invention.
Figure 5B:
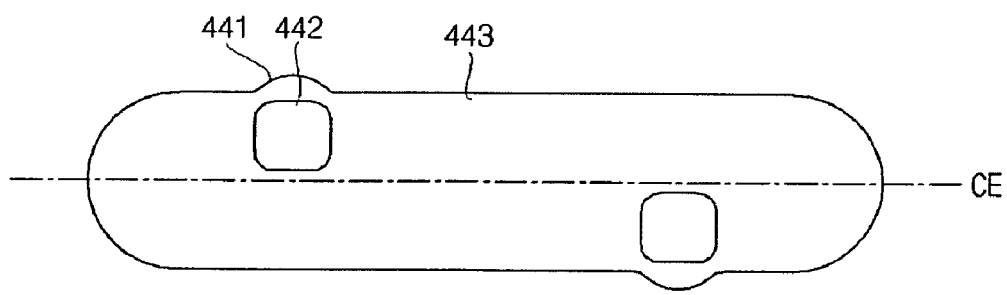
Figure 5C:
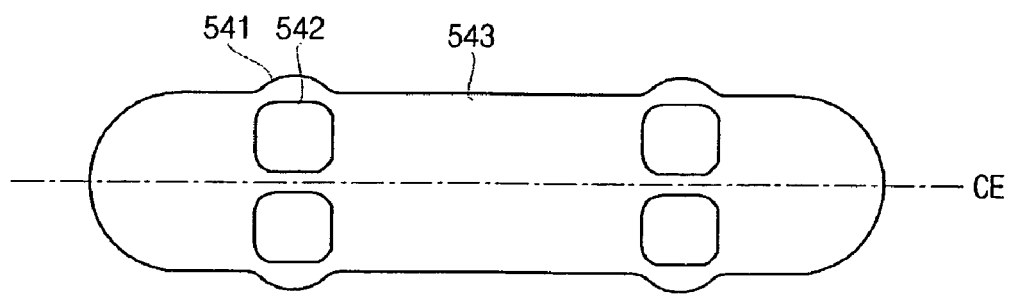

FIGS. 5a to 5c are views for demonstrating other examples of the present invention.

Referring to FIG. 5a, a protrusion 341 can be formed on only a first side surface 343L1 of the longitudinal sides of an insulating case 343. When the protrusion 341 is formed only on the one side 343L1, a deformation hole 342 may be formed being biased to the protrusion 341 or smaller than the embodiments described above. In particular, the deformation hole 342 can be formed smaller than the embodiments described above, by reducing the size of the hole in the portion close to a second side surface 342L2 on which the protrusion is not formed. When the protrusion is formed only on the side 343L1, the deformation force from the protrusion 341 is absorbed only on the side of the deformation hole that is close to the first side surface 343L1, so that it may be unnecessary to form the deformation hole 342 stretched up to the side 343L2. However, the present invention is not limited thereto. L1 is a distance between the first side surface 343L1 and its nearest side of the deformation hole 342, and L2 is a distance between the second side surface 343L2 and its nearest side of the deformation hole 342. In this embodiment of the present invention, L1 is smaller than L2, which means the deformation hole 342 is biased to the first side surface 343L1.

FIG. 5b shows an example in which a protrusion 441 and a deformation hole 442 are formed asymmetrically about the longitudinal axis, but symmetrically about an oblique line drawn with respect to the longitudinal axis. As shown in FIG. 5b, one protrusion is formed on a left side of a first side surface of the base 443, while another protrusion is formed on a right side of a second side surface of the base 443. One deformation hole is formed biased to the first side surface, and another deformation hole is formed biased to the second side surface. With respect to a horizontal center line CE that cuts the base 443 in half along the longitudinal axis, one deformation hole is located in an upper half of the base 443 closer to the protrusion formed on the first side surface, while another deformation hole is located in a lower half of the base 443 closer to the protrusion formed on the second side surface.

And, FIG. 5c is a view showing an example in which each of deformation holes is formed to correspond to one of protrusions. Protrusions are symmetrically formed on the first and second side surfaces. Instead of having one deformation hole between two protrusions facing each other as shown in FIG. 2a, two deformation holes are formed between the protrusions facing each other. With respect to a horizontal center line CE, one deformation hole is located in an upper half of the base 443 closer to the protrusion formed on the first side surface, while another deformation hole is located in a lower half of the base 443 closer to the protrusion formed on the second side surface. Each deformation hole 542 is deformed when pressure is applied to the corresponding protrusion 541, thereby dispersing the pressure applied to the protrusion 541. The example shown in FIG. 5c is only one of modified examples in the embodiments and the present invention is not limited thereto.

Comparing the insulating cases of FIGS. 5a and 5b, forming four individual protrusions, as in the embodiment shown in FIG. 5c, can make equal pressure being applied to the can. Therefore, it is possible make the insulating case rigidly support the can. However, insulating cases shown in FIGS. 5a and 5b also properly work depending on the design of the can and applications of the secondary battery. The shape of the insulating case is selectively determined according to the application of the secondary battery.

Figure 6:
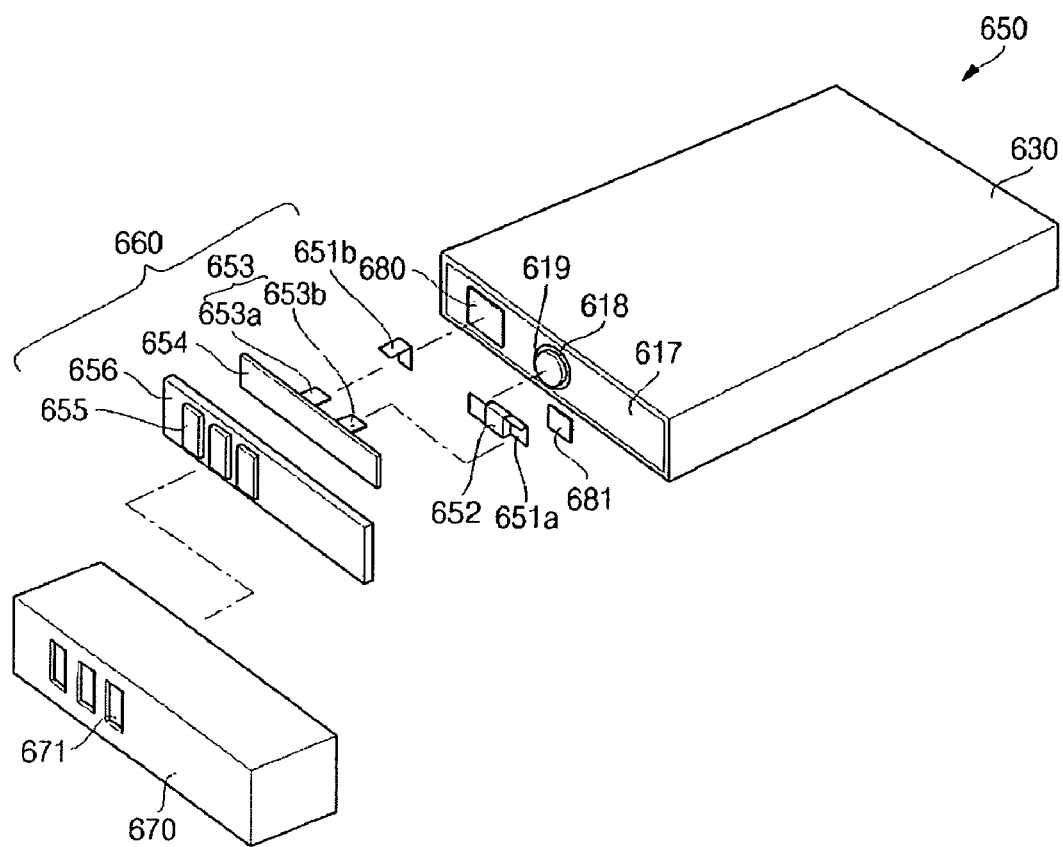
FIG. 6 is an insulating case showing a secondary battery including a bare cell with an insulating case of the present invention.

FIG. 6 shows a secondary battery that includes the insulating case proposed in the present invention.

Referring to FIG. 6, the secondary battery of the present invention comprises a bare cell 650, a circuit unit 660, and a case 670. The secondary battery of the present invention further comprises connection leads 651a and 651b for connecting the bare cell 650 to the circuit unit, a metal tab 680, and an insulating plate 681.

The bare cell 650 is manufactured by inserting the electrode assembly in the can 630 and assembling the insulating case and the cap assembly, as described referring to FIG. 1. In the completed bare cell 650 as shown in FIG. 6, the can 630, the electrode terminal 619, the gasket 618, and the cap plate 617 are exposed outside.

The outer surface of the can 630 may be attached with an exterior decoration (not shown) such as a label, and the like. The case 670 is coupled to the surface in which the electrode terminal 619 and the cap plate 617 are located. And, the can 630 can be used as a positive electrode or a negative electrode as described above.

The circuit unit 660 comprises a substrate 656, a circuit element 654 and connection terminals 653 formed on one surface of the substrate, and an exposure terminal 655. FIG. 6 shows the circuit element 654 separated from the substrate 656 for convenience of explanation. In an actual assembly, however, the circuit element 654 is formed on the substrate 656. The exposure terminal 655 is connected to the circuit element 654 through a conductive pattern (not shown) formed on the substrate 656. Further, one surface of the circuit element 654 is provided with the connection terminal 653.

The connection terminal 653 includes a positive electrode connection terminal 653a and a negative electrode connection terminal 653b. The positive electrode connection terminal 653a is connected to the positive electrode lead 651b, and the negative electrode connection terminal 653b to the negative electrode lead 651a.

The connection leads 651a and 651b electrically connect the bare cell 650 to the circuit unit 660. To this end, the positive electrode connection lead 651b is electrically connected to the cap plate 617 or the can 630 of the bare cell 650, and the negative electrode connection lead 651a is electrically connected to the electrode terminal 619. The positive electrode connection lead 651b may contact the metal tab 680 attached on the bare cell 650 so that it contacts the cap plate 617 or the can 630. Herein, the metal tab 680 may be formed in a thin plate of nickel, copper, and equivalent metals thereof. The negative electrode connection lead 651a is electrically connected to a temperature response element 652. Herein, the temperature response element is not necessarily connected to the negative electrode connection lead 651a and may be connected to the positive electrode connection lead 651b. The temperature response element 652 interrupts the current transfer when the temperature rises due to overcharge, overdischarge, a short circuit, and so on. The temperature response element 652 can easily be implemented using a positive temperature coefficient (PTC) or a thermal fuse. However, the present invention is not limited thereto.

The gasket 618 is inserted between the cap plate 617 and the electrode terminal 619 to insulate them.

The case 670 whose one surface is open and the inside is empty is coupled to the bare cell 650 by receiving a portion of the bare cell 650 and the circuit unit 660 in the empty space. FIG. 6 shows a pre-molded hard case. However, the case 670 can be formed by a resin molding using hot melt resin. However, the present invention is not limited thereto. The case 670 is provided with exposure terminal through holes 671 corresponding to the number of the exposure terminals 655 so that the exposure terminals 655 of the circuit unit 660 are exposed outside.

As described above, the secondary battery according to the present invention provides an excellent sealing material with low thermal deformation, excellent flame-retardation, and excellent electric insulation so as to be able to enhance its reliability.

And, the secondary battery according to the present invention can improve its mechanical stability by providing, as the sealing material, the insulating case with higher hardness as compared with a conventional insulating case and easily bond the insulating case and the can by providing the insulating case of a modified structure suitable for the high-hardness materials.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:
1. A secondary battery comprising:
a can having an open top;

an electrode assembly disposed inside the can and generating electricity;

a cap assembly sealing the open top of the can; and an insulating case interposed between the cap assembly and the electrode assembly, the insulating case comprising:

a base having an upper surface and a first side surface, the upper surface being parallel to the open top of the can and having a first deformation hole;

a first protrusion formed on the first side surface and protruding in a direction parallel to the upper surface, the first protrusion having a first contact portion that contacts an inner surface of the can, a line connecting a center of the first deformation hole to the first contact portion of the first protrusion is perpendicular to the first side surface.

2. The secondary battery as claimed in claim 1, wherein the insulating case is made of a material including polyphenylene sulfide.

3. The secondary battery as claimed in claim 1, wherein the base has a second side surface, the insulating case further comprising:

a second protrusion formed on the second side surface and protruding in a direction parallel to the upper surface, the second protrusion having a second contact portion that contacts the inner surface of the can, a line connecting the center of the first deformation hole to the second contact portion of the second protrusion being perpendicular to the second side surface.

4. The secondary battery as claimed in claim 3, wherein the first side surface is parallel to the second side surface.

5. The secondary battery as claimed in claim 1, wherein the base has a second side surface, and the upper surface of the base has a second deformation hole, the insulating case further comprising:

a second protrusion formed on the second side surface and protruding in a direction parallel to the upper surface, the second protrusion having a second contact portion that contacts the inner surface of the can, a line connecting the center of the second deformation hole to the second contact portion of the second protrusion being substantially perpendicular to the second side surface.

6. The secondary battery as claimed in claim 5, wherein the center of the first deformation hole is closer to the first side surface than the second side surface, and the center of the second deformation hole is closer to the second side surface than the first side surface.

7. The secondary battery as claimed in claim 6, wherein the first side surface is parallel to the second side surface, and the first protrusion and the second protrusion directly face each other across the base.

8. The secondary battery as claimed in claim 6, wherein the first side surface is parallel to the second side surface, and a line connecting the first contact portion of the first protrusion to the second contact portion of the second protrusion is not perpendicular to the first side surface.

9. The secondary battery as claimed in claim 1, wherein the insulating case further comprises:

a third protrusion formed on the first side surface and protruding in a direction parallel to the upper surface, the third protrusion having a third contact portion that contacts the inner surface of the can.

10. The secondary battery as claimed in claim 9, wherein the upper surface of the base has a third deformation hole, a line connecting the center of the third deformation hole to the third contact portion of the third protrusion is perpendicular to the first side surface.

11. The secondary battery as claimed in claim 1, wherein the base has a lead through hole, through which a lead drawn from the electrode assembly is penetrated, and an electrolyte injection hole for injecting an electrolyte inside the can.

12. The secondary battery as claimed in claim 1, wherein the first protrusion is formed in a shape of a hemisphere.

13. The secondary battery as claimed in claim 1, wherein the insulating case further comprises:

a wing formed on an edge of the upper surface of the base, the wing protruding in a direction perpendicular to the upper surface.

14. A secondary battery comprising:

a can having an open top;

an electrode assembly disposed inside the can and generating electricity;

a cap assembly sealing the open top of the can; and an insulating case interposed between the cap assembly and the electrode assembly, the insulating case is made of a material including polyphenylene sulfide, the insulating case comprising:

a base having an upper surface, a first side surface, and a second side surface, the upper surface being parallel to the open top of the can and having a first deformation hole;

a first protrusion formed on the first side surface and protruding in a direction parallel to the upper surface, the first protrusion having a first contact portion that contacts an inner surface of the can, a line connecting the center of the first deformation hole to the first contact portion of the first protrusion being perpendicular to the first side surface; and a second protrusion formed on the second side surface and protruding in a direction parallel to the upper surface, the second protrusion having a second contact portion that contacts the inner surface of the can, a line connecting the center of the first deformation hole to the second contact portion of the second protrusion being perpendicular to the second side surface.

* * * * *